United States Patent [19]
Khuntia

[11] 3,853,360
[45] Dec. 10, 1974

[54] MASTER COUPLING LINK

[75] Inventor: Natabara Khuntia, Hudson, Ohio

[73] Assignee: General Motors Corporation, Detroit, Mich.

[22] Filed: July 12, 1973

[21] Appl. No.: 378,507

[52] U.S. Cl. ............................................. 305/58
[51] Int. Cl. ............................................. B62d 55/20
[58] Field of Search ............... 305/58, 39; 74/258; 403/331, 381

[56] References Cited
UNITED STATES PATENTS

| | | | |
|---|---|---|---|
| 693,595 | 2/1902 | Frazier | 403/331 X |
| 2,107,238 | 2/1938 | DesRoaches | 403/331 |
| 2,257,418 | 9/1941 | Knutson | 403/331 |
| 3,020,096 | 2/1962 | Strnad | 305/58 |
| 3,096,661 | 7/1963 | Reinsma et al. | 305/58 |
| 3,659,112 | 4/1972 | Stedman | 305/58 |

Primary Examiner—Stanley H. Tollberg
Assistant Examiner—Norman L. Stack, Jr.
Attorney, Agent, or Firm—Edward J. Biskup

[57] ABSTRACT

A master link for a crawler tractor including a pair of transversely spaced link members interconnected by cap screws which extend through a track shoe. Each link member is composed of two separable sections which are joined together by a split dovetail type connection which forms a juncture that lies in a plane that is perpendicular to the plane of the track shoe.

1 Claim, 5 Drawing Figures

3,853,360

MASTER COUPLING LINK

This invention concerns a master link that is particularly adaptable for use with the endless track chain of a crawler tractor type vehicle.

The endless track chain of a crawler tractor is composed of a plurality of laterally spaced links interconnected by transversely extending pins. Spanning each pair of laterally spaced links is a track shoe having the usual grouser that serves to dig into the soil and provides traction as the tractor is driven. In track chains of this type it is common to provide a master link in each chain of links so as to permit separation of the link chain for disassembly of the endless track from the vehicle. One form of master link that has been used for this purpose is a two-piece link construction which permits servicing of the track in the field without the use of special tools and the present invention concerns this type of master link.

More specifically, the master link made according to the invention comprises a pair of transversely spaced link members which are interconnected by a plurality of cap screws which extend through a track shoe. Each of the link members comprises two longitudinally extending separable sections with end portions forming a pin connection bore and a pin bushing connection bore respectively. In the preferred form, the two sections of the link member have a pair of mating surfaces which form a juncture therebetween that is located in a plane parallel to the axes of the pin connection bore and the pin bushing connection bore and perpendicular to a horizontal plane passing through the axes of said bores. One of the mating surfaces is formed with a divided dovetail slot while the other mating surface has two dovetail projections extending outwardly therefrom. The arrangement is such that when the two projections are located within the divided slot, the two sections of each link member are interlocked so as to prevent separation thereof along the longitudinal axis of the link member and along an axis parallel to the axis of said bores.

The objects of the present invention are to provide a master link that is simple in construction and allows the track to be disassembled in the field without requiring special tools; to provide a two-piece master link which is held together by the track shoe and a divided dovetail connection between the two parts of the master link; to provide a two-piece master link having the separable parts thereof joined together by a split dovetail connection and fixed to a track shoe by cap screws which are located along axes that are parallel to the longitudinal axis of the dovetail connection; to provide a master link that can be separated into two parts by raising one part relative to the other part a distance approximately one third the overall height of the links and in which the two parts are normally interconnected by a track shoe and a pair of cap screws each of which extends into one link part only; and to provide a master link that is formed in two parts that are joined together by a dovetail connection which is divided into upper and lower portions and serve to prevent separation of the link parts along the longitudinal axis of the master link and along an axis that is normal to the plane of the master link.

Other objects and advantages of the present invention will be more apparent from the following detailed description when taken with the drawings in which:

FIG. 1 is a plan view showing a portion of a crawler tractor endless track chain;

Figure 2:
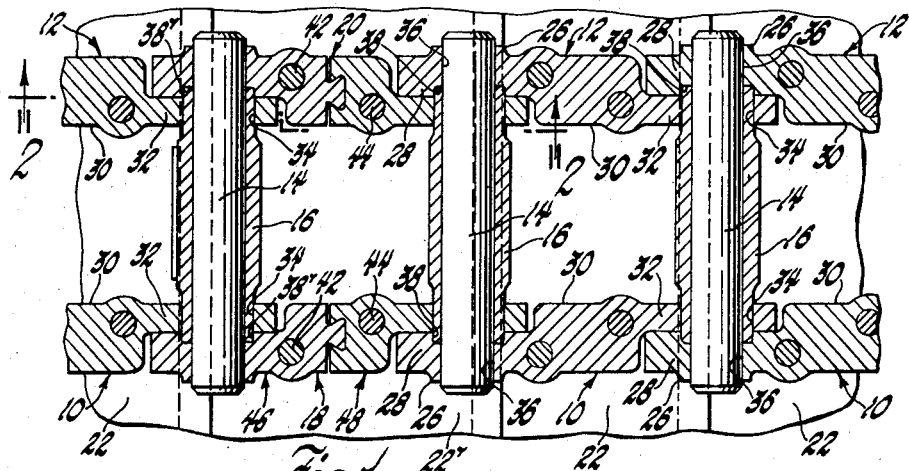
FIG. 2 is an enlarged elevation view taken on lines 2—2 of FIG. 1 and shows one part of a master link made according to the invention and incorporated with the endless track chain.
Figure 2:
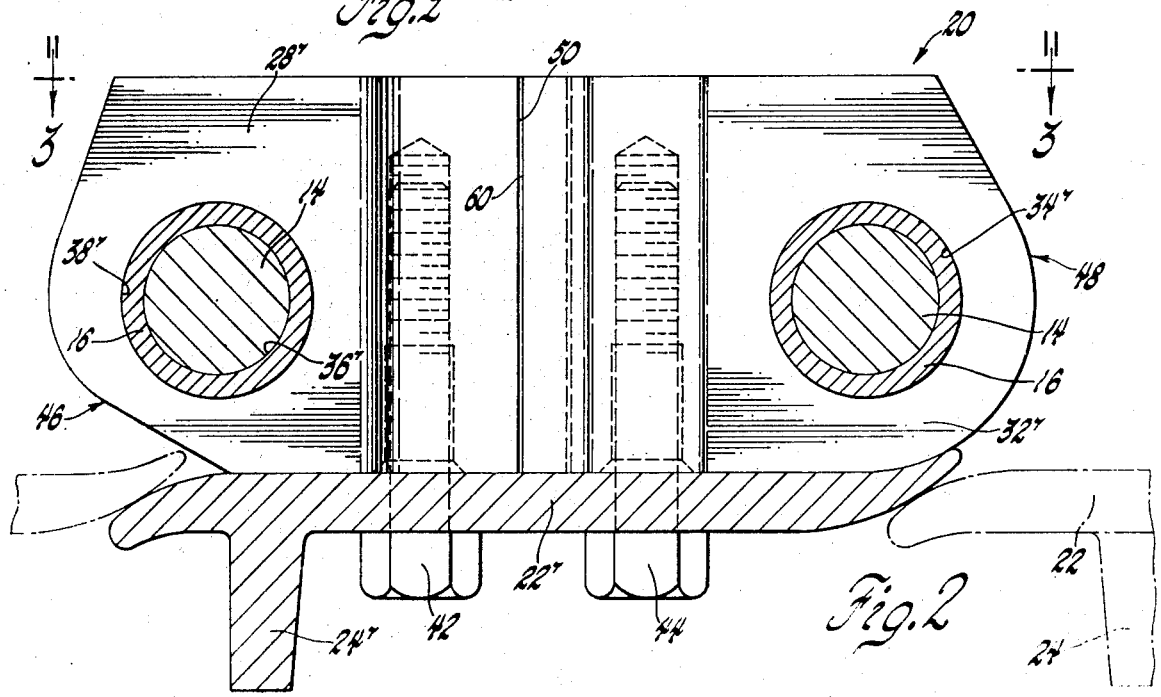

Referring now to the drawings and more particularly to FIG. 1 thereof, a portion of an endless track chain is shown of the type normally mounted on a crawler tractor and entrained about an idler wheel and drive sprocket of the tractor. The track chain consists of a plurality of identically formed and laterally spaced links 10 and 12 interconnected by transversely extending pins 14 and bushings 16 which provide hinged connections permitting the chain to articulate as it moves about the idler wheel and drive sprocket of the tractor. Interposed at one point in the chain is a master link assembly made according to the invention and composed of identical laterally spaced link members 18 and 20.

Each pair of laterally aligned links 10 and 12 supports a track shoe comprising a flat plate portion 22 the opposite ends of which are formed with integral extensions, the former of which is curved downwardly while the latter is curved upwardly so as to provide an overlapping arrangement between adjacent track shoes as seen in FIG. 2. Each track shoe is also formed with an integral grouser 24 which extends transversely across the track shoe.

Each pair of laterally aligned links 10 and 12 has one end thereof provided with a boss 26 formed with a thin end portion 28 which merges with an enlarged central portion 30 which in turn is integrally formed with an end portion 32 similar to that at the opposite end except for the elimination of the boss. Thus, each link 10 and 12 includes laterally offset parts each of which is adapted for mating engagement with the opposite end of an adjacent link.

The end portion 32 of each link 10 and 12 is provided with an enlarged bore 34 in which the bushing 16 is adapted to be driven with a press fit. Similarly, the end portion 28 of each of the links 10 and 12 is provided with a bore 36 which is smaller than and aligned with bore 34 and is adapted to receive the pin 14 with a press fit. It will be noted that the end of each bushing 16 projects laterally outwardly beyond the end of each link and into an annular recess 38 formed in the side wall of each end portion 28 of each link so as to surround the bore 36.

Figure 3:
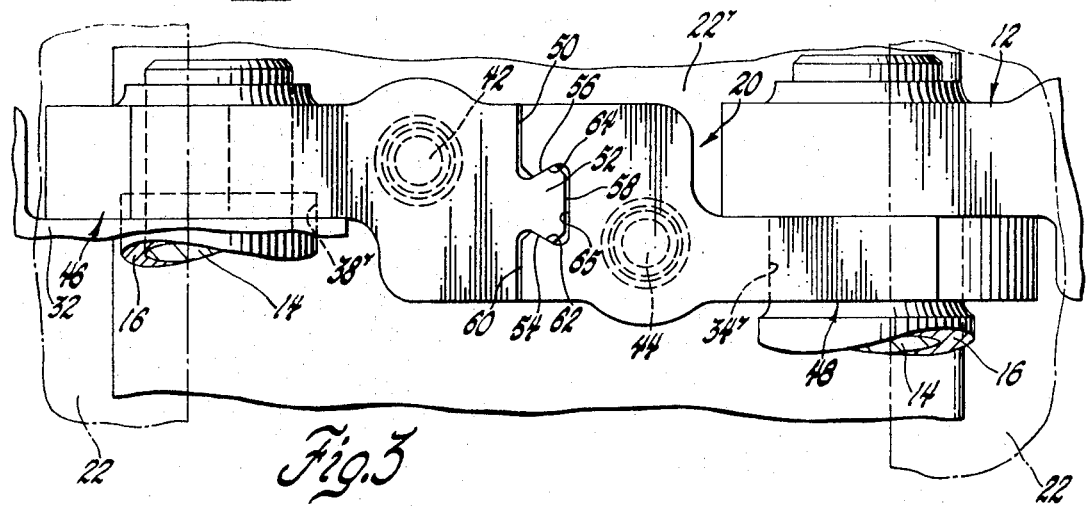
FIG. 3 is a plan view taken on line 3—3 of FIG. 2.

As should be apparent, in order to permit the track chain described above to be removed from the tractor, the master link is incorporated with the chain. In this connection and as seen in FIGS. 2 and 3, the transversely spaced link members 18 and 20 of the master link are interconnected by a track shoe which is identical in construction to the aforedescribed track shoes and accordingly has the same parts identified by the same numerals but primed. The track shoe is secured to each link member 18 and 20 by a pair of cap screws 42 and 44 which extend through the track shoe into threaded bores formed in the body of the link member. Each link member 18 and 20 is split into two longitudinally extending separable sections 46 and 48 which when locked together form a link member which is essentially the same in configuration as the link members 10 and 12. Accordingly, as in the case of the track shoes, those parts of link members 18 and 20 which are the same as the corresponding parts of link members 10 and 12, are identified by the same reference numerals but primed.

The primary difference between the master link and the link members 10 and 12 is that the former is made in two parts as alluded to above. Thus, as seen in FIGS. 2 and 3, section 46 at its inner end has a flat mating surface 50 which lies in a plane that is perpendicular to the plane of the flat portion 22' of the track shoe and parallel to the bores which receive the cap screws 42 and 44. The mating surface 50 is integrally formed with a dovetail projection 52 which is defined by outwardly diverging planar surfaces 54 and 56 and an end planar surface 58. Similarly, the inner end of section 48 is formed with a mating surface 60 which also lies in a plane that is perpendicular to the plane of the flat portion 22' of the track shoe. In this instance, however, the mating surface 60 is formed with a dovetail slot defined by outwardly converging planar side walls 62 and 64 and end wall 65. The dovetail slot serves to accommodate the dovetail projection 52 formed with section 46. Thus, when the sections 46 and 48 of both link members 18 and 20 are interconnected as shown in FIGS. 1 through 3, a master link is formed which is held together by the cap screws 42 and 44 which extend through the track shoe. This arrangement permits tensile forces acting along the longitudinal axis of the link to be distributed along the full length of the dovetail connection and in this manner minimizes the possibility of damage to the cap screws 42 and 44 due to shear forces acting thereon. It should also be noted that any laterally directed forces acting on the master link are also distributed along the dovetail connection.

From the above description, it should be apparent that when it is desired to disassemble an endless track having a master link made according to the invention, such job can be accomplished without requiring any special tools. It is only necessary to remove the cap screws 42 and 44 and afterwards separate the sections 46 and 48 by moving one section relative to the other along the longitudinal axis of the dovetail connection. It will also be noted that with the master link constructed as described above, each of the cap screws 42 and 44 extends within one section only of the link member and accordingly, there is less possibility of a weak portion existing which could cause failure of the link member during use.

Figure 4:
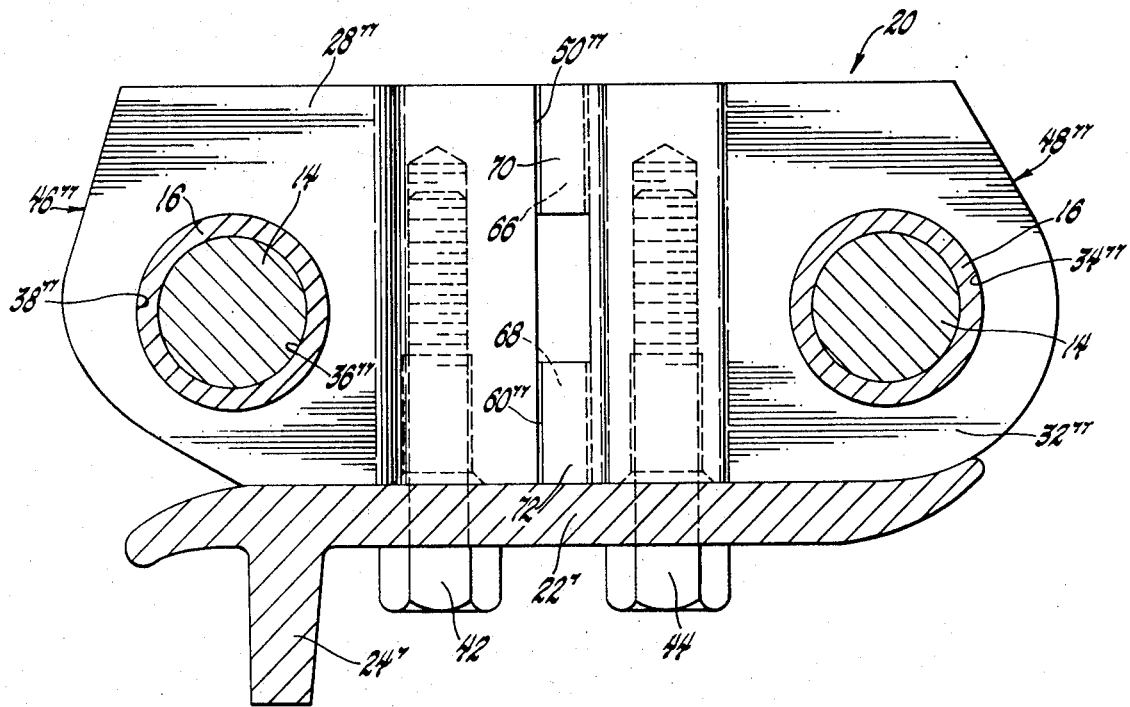
FIG. 4 is a view similar to FIG. 2 but shows a modified form of the master link.
Figure 5:
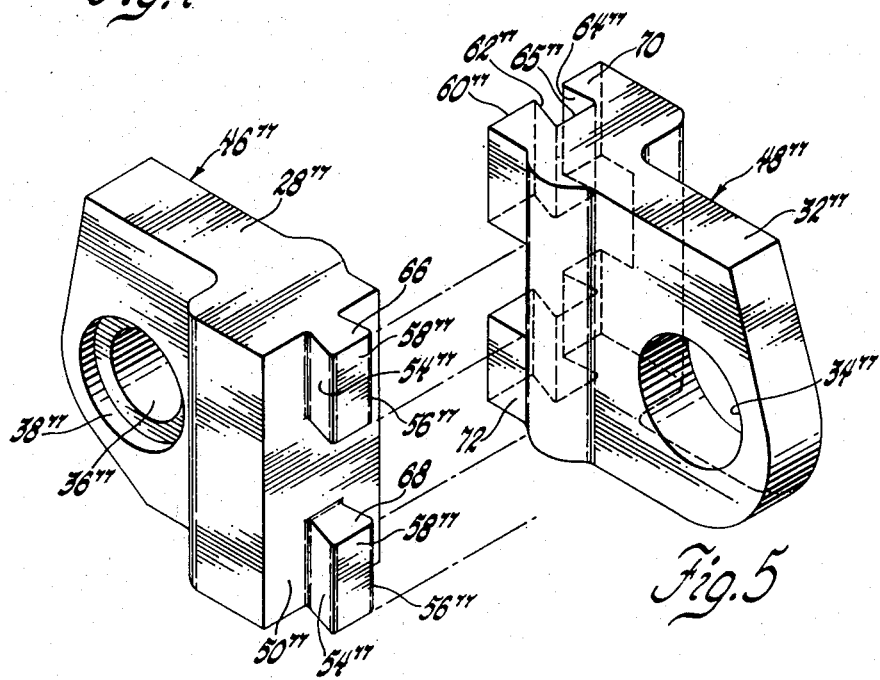
FIG. 5 is a perspective view showing the separable sections of the master link of FIG. 4.

FIGS. 4 and 5 show a modified form of the master link of FIGS. 1 through 3 that differs from the latter primarily in that it permits separation of the two parts without requiring one section to be moved its full vertical length relative to the other section before complete unlocking is realized. The modified form of the master link shown in FIGS. 4 and 5 has parts which are the same in configuration as those of the master link of FIGS. 1 through 3 and accordingly such parts have been identified by corresponding reference numerals but double-primed.

It will be noted that the master link of FIGS. 4 and 5 is basically the same in configuration as the master link of FIGS. 1 through 3 except that the dovetail projection formed with the mating surface 50" has been divided into upper and lower projections 66 and 68, respectively, separated by a cut-out portion. As with the dovetail projection 52, each dovetail projection 66 and 68 is defined by outwardly diverging planar surfaces 54" and 56" and an end surface 58". The dove-tail projections 66 and 68 are of equal vertical length and, as seen in FIG. 4, the distance between the projections 66 and 68 is the same as the vertical dimension of either of the latter parts.

Similarly, the mating surface 60" has been divided into upper and lower parts 70 and 72 which are of the same vertical length as upper and lower parts 66 and 68 and axially aligned therewith. As with the dovetail slot formed in section 48, the dovetail slot in each part 70 and 72 is defined by outwardly converging side walls 62" and 64" and an end wall 65".

Thus, it should be apparent from the above description that when the sections 46" and 48" are joined together, a rectangular opening, as seen in FIG. 4, extends through the link member. Moreover, the two cut-out portions formed in the sections 46" and 48" allow one section to be raised one-third of the distance required of the master link shown in FIGS. 1 through 3 to obtain separation of the master link. Accordingly, in those instances where space may be a problem, the modified master link permits separation to be realized quite readily. In all other ways, the modified master link of FIGS. 4 and 5 is similar to the master link of FIGS. 1–3 and functions in the same manner.

Various changes and modifications can be made in this construction without departing from the spirit of the invention. Such changes and modifications are contemplated by the inventor and he does not wish to be limited except by the scope of the appended claims.

I claim:

1. In a crawler tractor track; a master coupling link for detachably connecting the ends of said track comprising a pair of transversely spaced link members, a track shoe including a flat plate portion extending between said link members and fastened thereto by a plurality of cap screws, each of said link members having two longitudinally extending separable sections each of which has an outer end portion defining a bore hingedly connected with an end of said track and an inner end portion, said inner end portion of one of said sections being formed with vertically spaced upper and lower parts separated by a cut-out portion, said upper and lower parts and said cut-out portion being of equal longitudinal length, said parts each having a slot formed therein the full length thereof and the inner end portion of the other of said sections being formed with vertically spaced upper and lower projections which correspond in length and spacing to said upper and lower parts and are adapted to be located within said slots in said upper and lower parts so as to form an aperture between said sections, each of said projections having a cross section that progressively increases in width as it extends from said inner end portion and each of said slots having a configuration which is complementary to the configuration of the projections so as to interlock said sections when the projections are located in said slots and form a juncture that is located in a plane which is perpendicular to the flat plate portion of the track shoe so as to prevent separation of the sections along the longitudinal axis of the link member and along an axis parallel to the axis of said bore, and said upper and lower parts and projections being so arranged that upon removal of said cap screws said sections can be separated by relative movement thereof along an axis parallel to the plane of said juncture a distance equal to the longitudinal length of said cut-out portion.

* * * * *